US008937882B2

(12) United States Patent
Devarasetty (10) Patent No.: US 8,937,882 B2
(45) Date of Patent: Jan. 20, 2015

(54) METHODS, SYSTEMS, AND COMPUTER READABLE MEDIA FOR AUTOMATICALLY DECODING UPLINK DATA

(71) Applicant: Ixia, Calabasas, CA (US)

(72) Inventor: Prasada Rao Devarasetty, Cary, NC (US)

(73) Assignee: Ixia, Calabassas, CA (US)

(*) Notice: Subject to any disclaimer, the term of this patent is extended or adjusted under 35 U.S.C. 154(b) by 72 days.

(21) Appl. No.: 13/668,203

(22) Filed: Nov. 2, 2012

(65) Prior Publication Data

US 2014/0119213 A1 May 1, 2014

Related U.S. Application Data

(60) Provisional application No. 61/719,295, filed on Oct. 26, 2012.

(51) Int. Cl.
*H04W 24/00* (2009.01)
*H04W 24/02* (2009.01)

(52) U.S. Cl.
CPC ...................... *H04W 24/02* (2013.01)
USPC ............ 370/252; 370/328; 370/349; 455/450

(58) Field of Classification Search
None
See application file for complete search history.

(56) References Cited

U.S. PATENT DOCUMENTS

| 2007/0116046 | A1* | 5/2007 | Liu et al. ............... 370/466 |
| 2009/0083234 | A1* | 3/2009 | Yeom et al. ............ 707/3 |
| 2009/0196244 | A1 | 8/2009 | Chun et al. |
| 2010/0165847 | A1 | 7/2010 | Kamuf et al. |
| 2010/0291940 | A1* | 11/2010 | Koo et al. ............... 455/450 |
| 2010/0303011 | A1 | 12/2010 | Pan et al. |
| 2010/0331030 | A1 | 12/2010 | Nory et al. |
| 2011/0076962 | A1 | 3/2011 | Chen et al. |
| 2011/0110315 | A1 | 5/2011 | Chen et al. |
| 2012/0094651 | A1 | 4/2012 | Chun et al. |
| 2013/0010724 | A1 | 1/2013 | Han et al. |
| 2013/0034062 | A1 | 2/2013 | Seo et al. |
| 2013/0058240 | A1 | 3/2013 | Kim et al. |
| 2013/0058294 | A1 | 3/2013 | Miki et al. |
| 2013/0058306 | A1 | 3/2013 | Noh et al. |
| 2013/0070689 | A1 | 3/2013 | Liu et al. |

(Continued)

FOREIGN PATENT DOCUMENTS

WO WO 2013/096585 A1 6/2013

OTHER PUBLICATIONS

Commonly assigned, co-pending U.S. Appl. No. 13/682,663 for "Methods, Systems, and Computer Readable Media for Rapid Decoding of Wireless Communications Network Uplink Data," (Unpublished, filed Nov. 20, 2012).

(Continued)

*Primary Examiner* — Chi H Pham
*Assistant Examiner* — Shick Hom
(74) *Attorney, Agent, or Firm* — Jenkins, Wilson, Taylor & Hunt, P.A.

(57) ABSTRACT

Methods, systems, and computer readable media for decoding uplink control information are disclosed. According to one method, bit widths for possible valid configurations of uplink control information parameters are stored. Uplink data generated by receiving uplink data generated by at least one user equipment (UE) or simulated UE is received. The uplink data is decoded by iteratively utilizing the bit widths for the possible valid configurations.

29 Claims, 4 Drawing Sheets

(56) References Cited

U.S. PATENT DOCUMENTS

| | | | |
|---|---|---|---|
| 2013/0070690 | A1 | 3/2013 | Moon et al. |
| 2013/0088973 | A1 | 4/2013 | Yang et al. |
| 2013/0121168 | A1 | 5/2013 | Luo et al. |
| 2013/0121295 | A1 | 5/2013 | Saito et al. |
| 2013/0155872 | A1 | 6/2013 | Subramanian et al. |
| 2014/0140271 | A1 | 5/2014 | Devarasetty et al. |

OTHER PUBLICATIONS

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.5.0 (Jun. 2012).

Isanjole, "WaveJudge 4900A LTE Analyzer," Isanjole, pp. 1-2 (Feb. 2012).

Commonly assigned, co-pending U.S. Appl. No. 13/336,005 for "Methods, Systems, and Computer Readable Media for Reducing the Impact of False Downlink Control Information (DCI) Detection in Long Term Evolution (LTE) Physical Downlink Control Channel (PDCCH) Data," (unpublished, filed Dec. 23, 2011).

"3rd Generation Partnership Project; Technical Specification Group Radio Access Network; Evolved Universal Terrestrial Radio Access (E-UTRA); Physical layer procedures (Release 10)," 3GPP TS 36.213, V10.3.0, pp. 1-122 (Sep. 2011).

"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0, pp. 1-79 (Sep. 2011).

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0, pp. 1-103 (Sep. 2011).

"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).

"PDCCH Blind Decoding," PDCCH Decoding Example, http://www.steepestascent.com, pp. 1-6 (Copyright 2009-2011, dowloaded from the Internet Dec. 4, 2011).

"3rd Generation Partnership Project; Technical Specification Group Radio Terrestrial Radio Access Network; Evolved Universal Terrestrial Radio Access (E-UTRA); Multiplexing and channel coding (Release 11), " 3GPP TS 36.212, V11.0.0 (Sep. 2012).

Final Office Action for U.S. Appl. No. 13/336,005 (Feb. 26, 2014).

Non-Final Office Action for U.S. Appl. No. 13/336,005 (Jul. 2, 2013).

Notification of Transmittal of the International Search Report and the Written Opinion of the International Searching Authority, or the Declaration for International Application No. PCT/US2012/070877 (Mar. 28, 2013).

* cited by examiner

METHODS, SYSTEMS, AND COMPUTER READABLE MEDIA FOR AUTOMATICALLY DECODING UPLINK DATA

RELATED APPLICATIONS

The presently disclosed subject matter claims the benefit of U.S. Provisional Patent Application Ser. No. 61/719,295, filed Oct. 26, 2012; the disclosure of which is incorporated herein by reference in its entirety.

TECHNICAL FIELD

The subject matter described herein relates to decoding uplink data in a real or simulated mobile communications network. More specifically, the subject matter relates to methods, systems, and computer readable media for automatically decoding uplink data.

BACKGROUND

Long term evolution (LTE) and other radio communications technologies can require significant infrastructure and configuration. Generally, network operators test various aspects of their network equipment to ensure reliable and efficient operation. Network operators typically simulate various conditions before equipment is deployed in a live network to decrease avoidable delays and/or other problems.

Various technical specifications, such as the 3rd Generation Partnership Project (3GPP) Technical Specifications 36.212 V11.0.0 (2012-09), the disclosure of which is incorporated herein by reference in its entirety, define data formats for LTE communications. Generally, data from the network to a user device is referred to as downlink data and data from the user device to the network is referred to as uplink data. For example, a user device or user equipment (UE), such as a cellular mobile phone or tablet computer, may communicate with an enhanced or evolved Node B (eNode B) via the cellular radio transmission link. Data that is sent from the eNode B to the UE is downlink data, and data that is sent from the UE to the eNode B is uplink data.

Uplink and downlink data may include separate channels defined in the physical layer of the protocol stack, herein referred to as "physical channels." Uplink and downlink data may be transmitted using one or more multiplexing and/or modulation schemes. For example, in some LTE networks, downlink data is transmitted using an orthogonal frequency-division multiplexing (OFDM) and uplink data is transmitted using single carrier frequency-division multiple access (SC-FDMA). Such schemes may allow multiple streams of data to be sent simultaneously (e.g., at different frequencies). While such schemes may allow data to be communicated at high-speed, significant processing is required to encode and decode the data. For example, a UE may perform channel coding, multiplexing, and interleaving of data and control streams, which are then sent to the eNode B over the air (RF) interface. After pre-processing the received signal from the UE, the eNode B may perform channel delineation for uplink physical channels and/or other baseband processing. After separating LTE data from various physical layer channels, the LTE data may be further processed.

During uplink processing, the data transmitted via the physical channels may be processed. One physical channel processed during uplink processing may be a physical uplink shared channel (PUSCH) and may include control information, such as a channel quality indicator (CQI), a precoding matrix indicator (PMI), a rank indication (RI), and a hybrid automatic repeat request (HARQ) acknowledgements (ACKs). Various factors or configuration parameters may affect the format or configuration of the uplink channel, including any control information that may be stored therein. As such, decoding the uplink channel and identifying control information therein may be problematic if the configuration of the actual UE or UEs that transmitted the data over the uplink channel is not known. For example, one method for verifying the decoding of data transmitted over the uplink channel is to manually input the configuration for each UE that transmitted on the uplink channel during a given time interval. Such manual UE configuration is time, consuming and may not be possible if the actual configuration of the UEs that transmitted over the uplink channel is not known.

Accordingly, in light of these difficulties, a need exists for improved methods, systems, and computer readable media for automatically decoding uplink data

SUMMARY

Methods, systems, and computer readable media for automatically decoding data are disclosed. According to one method, bit widths for possible valid configurations of uplink control information parameters are stored. Uplink data generated by receiving uplink data generated by at least one user equipment (UE) or simulated UE is received. The uplink data is decoded by iteratively utilizing the bit widths for the possible valid configurations.

The subject matter described herein also includes a system for automatically decoding uplink data without knowledge of actual user equipment (UE) configurations used to generate the uplink data. The system includes a memory configured to store bit widths for possible valid configurations of uplink control information The system further includes an uplink data decoder configured to receive uplink data generated by at least on UE or simulated UE and to iteratively utilize the bit widths for the possible valid configurations to decode the uplink data.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

As used herein, the terms "user equipment" "user device," or "UE" refer to any computing or communications device that is capable of accessing or communicating via a communications network

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for automatically decoding uplink data. When testing LTE networks and/or other wireless communications networks, it may be desirable to test the response of the networks and other equipment under non-trivial load conditions. For example, it may be desirable to test an eNode B by simulating multiple UEs experiencing various channel conditions.

In real-world applications, UE specific control information, such as a CQI, an RI, and/or a PMI, may be provided to an eNode B via uplink data in a periodic or aperiodic manner. The uplink data may be encoded (e.g., using SC-FDMA or OFDMA) and, as such, the control information may not be readily identifiable without decoding the uplink data. For example, control information may be multiplexed or otherwise allocated in uplink data in different arrangements or configurations depending on various configuration parameters. Generally, a receiving eNode B will have configuration information such that the uplink data can be decoded. For example, during an initial negotiation, an eNode B and a UE may agree on various configuration parameters. Using this information, an eNode B may be able to decode uplink data received from the UE. While the eNode B may be able to identify control information for a UE in some uplink data, the eNode B may be unable to identify control information (e.g., a CQI and/or PMI) for the UE in subsequent uplink data if the eNode B does not maintain current configuration information. Maintaining current configuration information is particular concern during eNode B development, testing, and deployment. This is because the type of control information and location of the control information may change for subsequent uplink data (e.g., subframes) and an eNode B can fail to properly maintain the configuration records for each UE.

In testing, monitoring, and/or debugging uplink scenarios, conventional testing platforms are not capable of decoding uplink data without having configuration information. For example, a test operator may be required to manually enter configuration information (e.g., a set of configuration parameters) at a testing platform which is typically obtained on the downlink and usually at the beginning of the call. While manually entering configuration information allows a testing platform to decode uplink data, manually entering configuration information can take a significant amount of time and can be error prone. These issues are further magnified when configuration information for numerous UEs (e.g., 4000 UEs) is manually entered.

Advantageously, aspects of the subject matter described herein can be used to analyze uplink data with no knowledge of UE configuration, such as CQI, PMI, or RI configuration. For example, by storing bit widths for possible valid configurations of uplink control information parameters and iterating through the configurations until the uplink data is properly decoded, a testing platform, a monitoring platform, or an eNode B in accordance with aspects of the present subject matter can automatically identify UE specific control information in the uplink data without requiring prior knowledge of the actual UE configuration(s) used to generate the uplink data.

Control information parameter bit widths indicate the number of bits used for each control information parameter. The bit widths for individual parameters vary with the configuration. For example, TS 36.212 discloses control information bit widths for numerous UE configurations. These bit widths may identify how much of the uplink data is configuration information and how much of the uplink data is other information, e.g., a payload portion and CRC portion. For example, using a possible bit width associated with control information, a testing platform, a monitoring platform, or an eNode B that implements automatic downlink decoding as described herein may distinguish potential configuration information from a potential payload in the uplink data. The platform may verify whether the potential configuration information is actual configuration information by computing a CRC for the potential payload and comparing the CRC with a known CRC (which may be stored in the uplink data) associated with the actual payload portion. If the CRCs match, the platform may identify control information by decoding the individual control information parameters using the bit widths for the configuration that resulted in correct decoding of the CRC. If the CRCs do not match, the testing platform may attempt to decode the uplink data using other possible bit width configuration until a bit width configuration is found where the CRCs match. By using bit width configurations to decode uplink data, aspects of the subject matter described herein can effectively detect a control configuration automatically, can decode uplink data (e.g., a PUSCH data portion), and can avoid the need for maintaining control information configurations for particular UEs. In some embodiments, aspects of the subject matter described herein may store all possible valid control information configurations and may use the configurations in performing a "brute force attack" on uplink data, for which the individual UE configurations used to generate the uplink data is not known, until the uplink data is decoded.

Figure 1:
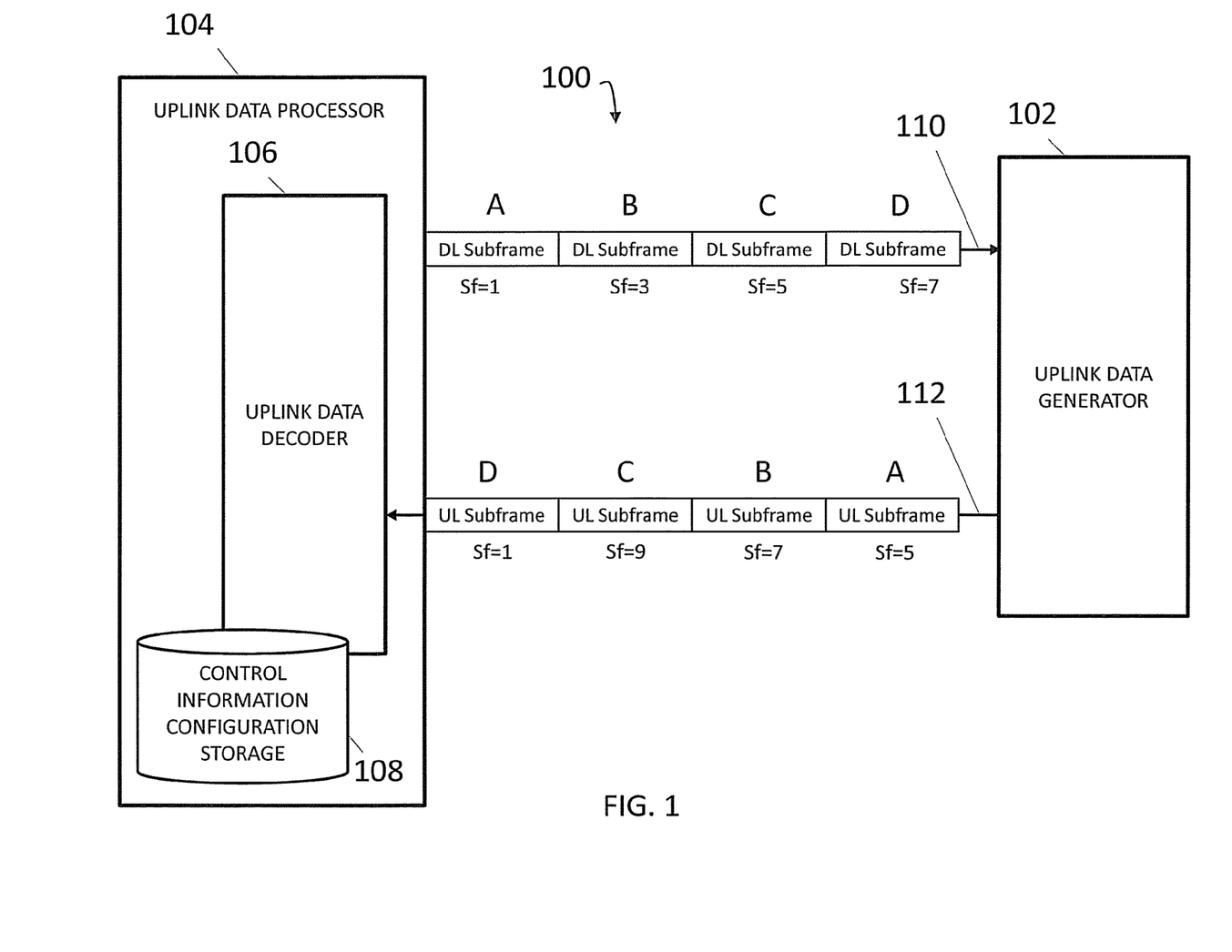
FIG. 1 is a diagram illustrating an exemplary system for automatically decoding uplink data according to an embodiment of the subject matter described herein.

FIG. 1 is a diagram illustrating an exemplary system for decoding uplink data according to an embodiment of the subject matter described herein. In FIG. 1, a network 100 may include an uplink data generator 102 and an uplink data processor 104. Uplink data generator 102 may be one or more actual UEs for one or more simulated UEs. In one example, uplink data generator 102 may be a test platform used to simulate multiple UEs to test network equipment, such as an eNode B. Uplink data processor 104 may be a test platform, a monitoring platform, or a portion of an eNode B or other node that decodes uplink data. For example, if uplink data processor 104 is implemented on a monitoring platform, uplink data processor 104 may include one or more link probes to passively copy uplink data transmitted from uplink data generator 102 to an eNode B and to attempt to automatically decode the uplink data. Uplink data processor 104 may also be implemented as part of an eNode B to attempt to automatically decode uplink data to verify or confirm uplink data decoded by the eNode B using known UE configurations.

In some embodiments, uplink data generator 102 may be a single node or may be distributed across multiple computing platforms or nodes. Uplink data generator 102 may include various modules for performing one or more aspects of UE simulation. For example, uplink data generator 102 may include a module for encoding, multiplexing and/or modulating channel report information (e.g., a CQI, a PMI and/or an RI) associated with one or more UEs in a PUSCH data portion of a radio subframe. Uplink data generator _102 may also include a module for transmitting one or more radio subframes via a radio communications interface.

In an alternate embodiment, uplink data processor 104 may be a WiMAX base station or high speed packet access (HSPA) transceiver that decodes uplink data. In yet another alternate embodiment, uplink data processor 104 may be a component of a radio network controller (RNC) or a base station (BS). Implementing automatic uplink data decoding as described herein on any node that needs to decode such data or verify the decoding of such data is intended to be within the scope of the subject matter described herein.

In the illustrated example, uplink data processor 104 includes various components for performing automatic uplink data decoding and uplink control information identification as described herein. Such components include an uplink data decoder 106 and a control information configuration (CIC) storage 108. Uplink data decoder 106 utilizes bit width information stored in control information configuration storage 108 to automatically decode uplink data. Control information configuration storage 108 stores bit widths for valid configurations of uplink data. As such, control information configuration storage may include or may be embodied in a memory, such as a solid state memory and/or one or more disks.

Uplink data decoder 106 may be any suitable entity (e.g., ASIC, FPGA or software executing on a processor) used in processing uplink data (e.g., LTE subframes, WiMAX PDUs, and HSPA frames). In some embodiments, Uplink data decoder 106 may be configured to receive uplink data, such as a PUSCH data portion. However, uplink data decoder 106 does not have prior knowledge of how many UEs are in the PUSCH data portion or the configurations of the UEs that created the PUSCH data portion. Uplink data decoder 106 may use stored configuration information (e.g., control information configurations) to automatically decode the uplink data. As will be set forth in detail below, uplink data decoder 106 may iterate through bit widths stored for possible valid configurations of uplink data and use the bit widths in an attempt to decode the uplink data. When a configuration results in uplink data that decodes correctly, that configuration may be used to identify control information, such as a CQI, a PMI and/or an RI. In some embodiments, uplink data decoder 106 may attempt to decode the uplink data, or portions thereof, multiple times using multiple different configurations. For example, uplink data may include a plurality of radio subframes and each subframe may include UE specific control information for multiple UEs multiplexed with other LTE data. In this example, the control information for each UE may require a different configuration to decode the relevant portion of uplink data.

CIC storage 108 may be any suitable entity (e.g., a database embodied or stored in a computer readable medium, such as a memory) for storing configuration information or related information. CIC storage 108 may be accessible by uplink data decoder 106 and/or another node or module. In some embodiments, CIC storage 108 may be located externally to or integrated with one or more modules. CIC storage 108 may include configuration parameters and associated control information bit widths. Configuration parameters may include a configuration parameter, an antenna ports value, a bandwidth amount, a sub-band report indicator, a bit width associated with a sub-band label, a wideband report indicator, a rank indication, a precoding matrix indicator, or a transmission mode. Control information bit widths may include a value indicative of a number of bits in uplink data (e.g., a LTE physical channel, such as PUSCH) that is used to store control information. In some embodiments, bit widths may be derived from, based on, or associated with bit width information in TS 36.212.

Table 1 shown below illustrates an example of bit width information from TS 36.212 that may be used by uplink data decoder 106 in automatically decoding uplink data.

| | Bit width | | | |
|---|---|---|---|---|
| | 2 antenna ports | | 4 antenna ports | |
| Field | Rank = 1 | Rank = 2 | Rank = 1 | Rank > 1 |
| Wide-band CQI | 4 | 4 | 4 | 4 |
| Spatial differential CQI | 0 | 3 | 0 | 3 |
| Precoding matrix indicator | 2 | 1 | 4 | 4 |

In the above-referenced table, bit widths for different possible UE configurations are listed. For example, if the UE has two antenna ports with a rank of 1, the wide band CQI is 4 bits, the spatial differential CQI is 0 bits, and the precoding matrix indicator is 2 bits. The combination of 4, 0, and 2 bits corresponds to one possible UE configuration. Another possible UE configuration corresponds to two antenna ports and a rank of 2, where the bit widths of the parameters are 4, 3, and 1 bit. Uplink data decoder 106 may iterate through the various combinations in Table 1 and in other tables for different numbers of antenna ports and transmission modes to identify the bit width configuration that properly decodes uplink data.

In some embodiments, information for de-multiplexing control information in any given PUSCH or other physical channel resource block or map may be stored and/or derived from stored bit widths. For example, prior to transmission to uplink data processor 104, control information may be multiplexed with other LTE data (e.g., user data) in one of a finite number of ways. By storing or identifying the finite number of ways control information can be multiplexed in uplink data, uplink data decoder 106 may try various configurations until a configuration is found that accurately decodes or de-multiplexes the uplink data (e.g., a PUSCH data portion). As such, uplink data decoder 106 may be capable of decoding uplink data without prior knowledge of the configuration parameters, such as CQI, PMI and RI.

As illustrated in FIG. 1, downlink data 110 may be sent to uplink data generator 102. In some embodiments, downlink data 110 may be transmitted via one or more radio frames. Each radio frame may have parts, such as subframes, that can contain large amounts of data. For example, in a 20MHz transmission environment, a subframe may include a hundred resource blocks (RBs). RBs may generally be thought of as two-dimensional arrays of data portions called resource elements (REs). Each RB may contain various configurations or arrangements of REs. That is, each RB may have REs of different physical channels and signals. Moreover, an RB configuration may be different among RBs in a subframe, and RB configurations may also vary among subframes, e.g., based on traffic or network conditions.

After receiving downlink data 110, uplink data generator 102 may perform channel delineation to convert the REs into physical channels and may then process the physical channels. Uplink data generator 102 may also compute or determine control information, such as a channel status report, uplink resource allocations, or other information. For example, uplink data generator 102 may compute a CQI value for every UE being simulated. Using information received in the downlink data 112 (e.g., scheduling grant information and transmission modes of various UEs), uplink data generator 102 may generate uplink data 112 and provide the control information in the uplink data. For example, control information for a UE 'X' may be stored in subframe B and control information for a UE 'Z' may be stored in subframe D. In each subframe or physical channel therein, the respective control information may be allocated or assigned in a different configuration.

In some embodiments, control information may be used to relay an estimate of the channel properties to a base station or other node in order to aid channel dependent scheduling. Control information may include channel status reports. For example, a channel status report may include a CQI for indicating a recommended modulation scheme and coding rate for use in the downlink transmission, an RI for indicating rank of a channel and usable to determine the optimal number of layers that should be used for the downlink transmission (e.g., used for spatial multiplexed systems), and/or a PMI for indicating which precoding matrix (e.g., used in closed loop spatial multiplexing systems). HARQ ACKs may also be transmitted with channel status report information. In some embodiments, two forms of channel coding may exist. For example, one form may involve coding CQI data alone and another for the combination of CQI with HARQ-ACK.

In some embodiments, control information may be brought together in a range of different configurations depending on the transmission mode of the UE or simulated UE (e.g., mobile terminal). As such, the total number of bits (e.g., a bit width or a bit length) used to report control information may change and may depend on various factors, including a transmission mode of a related UE. The possible bit widths for the various wideband and UE selected sub-band reports may be found in TS36.212, e.g., sections 5.2.3.3.1 and 5.2.3.3.2, respectively.

Uplink data 112 generated by one or more actual or simulated UEs may be sent to uplink data processor 104. For example, uplink data generator 102 may transmit a periodic channel status report on physical uplink control channel (PUCCH) in subframes with no PUSCH allocation. In another example, uplink data generator 102 may transmit a periodic or aperiodic channel status report on PUSCH in sub frames with PUSCH allocation. After receiving the uplink data 112, uplink data processor 104 may perform channel delineation to convert the REs into physical channels and may then process the physical channels. For example, a PUSCH or PUCCH may be decoded and control information may be identified using aspects of the subject matter described herein.

It will be appreciated that the above described modules are for illustrative purposes and that features or portions of features described herein may be performed by different and/or additional modules, components, or nodes. For example, aspects of identifying control information described herein may be performed by uplink data decoder 106 and/or other modules. In some embodiments, uplink data decoder 106 may be integrated with or incorporated within DUT 102. In another example, storage 108 may be located at a separate node or distributed or separated across multiple nodes.

Figure 2:
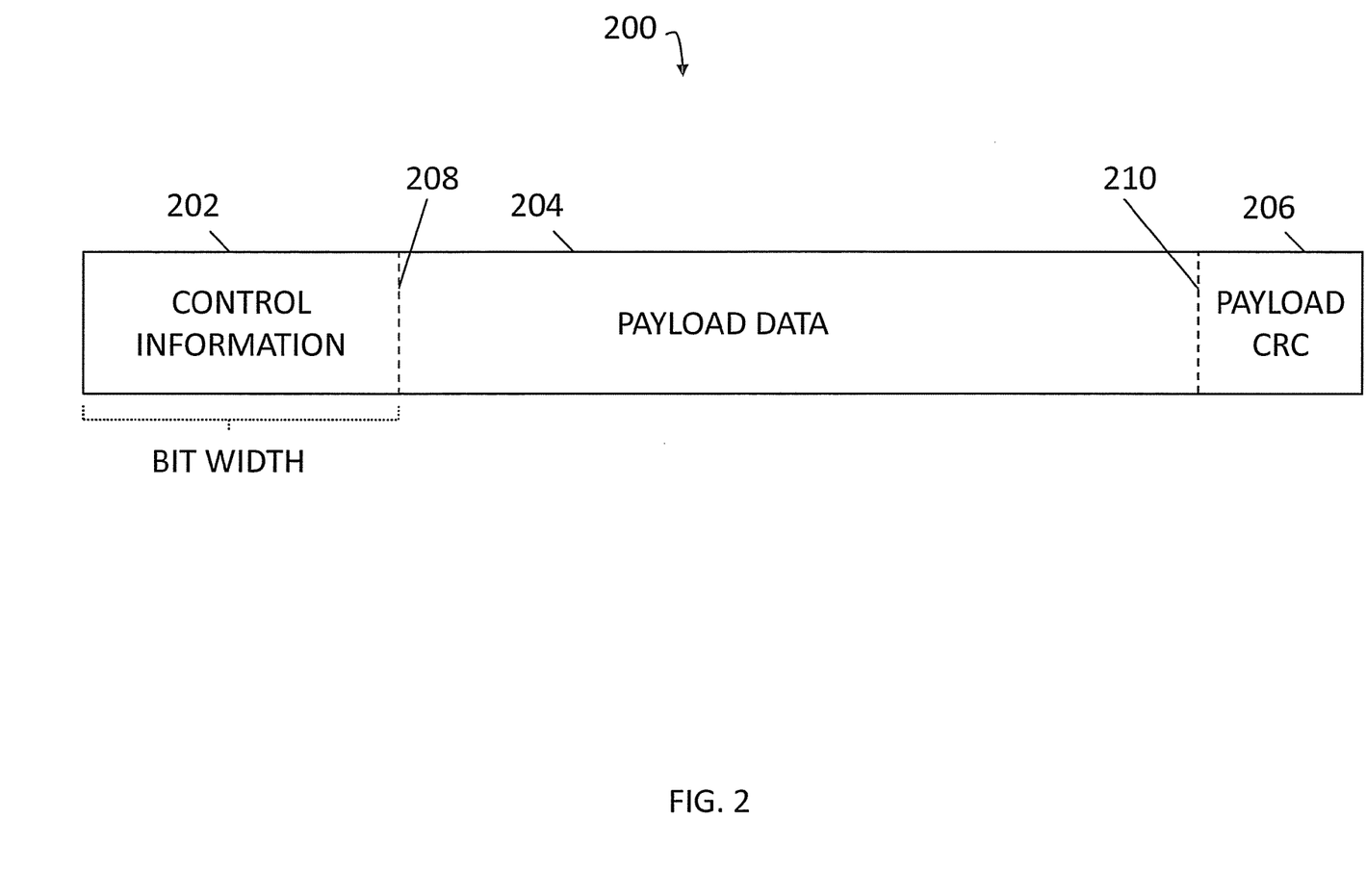
FIG. 2 is a diagram illustrating an exemplary uplink data.

FIG. 2 is a diagram illustrating exemplary uplink data 200. Uplink data 200 may represent a generic subframe, an LTE physical channel (e.g., usually represented in 2 dimensional resource elements), a PUSCH data portion, a PUCCH data portion, an uplink channel portion, a subframe, a packet data unit (PDU), or a data portion. For example, uplink data 200 may represent a portion of an LTE uplink channel, after channel delineation has been performed on an LTE subframe. In some embodiments, uplink data 200 may represent a sequence of bits after some amount of data processing. For example, after de-multiplexing a radio subframe, uplink data 200 may represent bits associated with a PUSCH data portion.

Uplink data 200 may include various portions or parts, such as control information 202, payload data 204, and a payload CRC 206. Control information 202 may be a portion for storing a channel status report or other control information. Control information 202, may or may not be together and may be distributed with in payload data 204. Control information 202 may or may not have a CRC value. Payload data 204 may be a portion for storing payload or user data. Payload CRC 206 may be a portion for storing a CRC value that can verify the integrity of payload data 204. In some embodiments, payload CRC 206 may be a fixed size (e.g., constant or known size) portion and may be readily ascertainable by uplink data processor 104 or modules therein. For example, uplink data processor 104 may be aware that payload CRC 206 is 24 bits in size and can identify a boundary 210 between payload CRC 206 and payload data 204 or other portions. Boundary 210 may be a logical demarcation indicator for distinguishing payload CRC 206 from payload data 204. In some embodiments, control information 202 and payload data 204 may be variable size. For example, a first uplink data 200 may include a 30 bit size control information 202 and 5000 bit size payload data 204 and a second uplink data 200 may include 4 bit size control information 202 and 3000 bit size payload data 204.

In some embodiments, uplink data processor 104 or modules therein (e.g., uplink data decoder 106) may store all possible valid combinations bit widths for control information 202. For example, TS 36.212 discloses a set of allowed bit widths for control information in LTE uplink data for various different UE configurations. In this example, the set of allowed bit widths may be stored in CIC storage 108 and may be used by uplink data decoder 106. Using the valid combinations of bit widths for control information parameters, uplink data processor 104 may identify control information 202 by identifying a boundary 208 between control information 202 and payload data 204. Uplink data processor 104 may verify a bit width configuration as valid by computing a new CRC for a resulting (e.g., potential) payload data portion. If the new CRC matches payload CRC 206, uplink data may be deemed verified and control information 202 may be identified.

It will be appreciated that FIG. 2 is for illustrative purposes and uplink data 200 as shown in FIG. 2 may not accurately reflect the layout or configuration of every data type represented.

Figure 3:
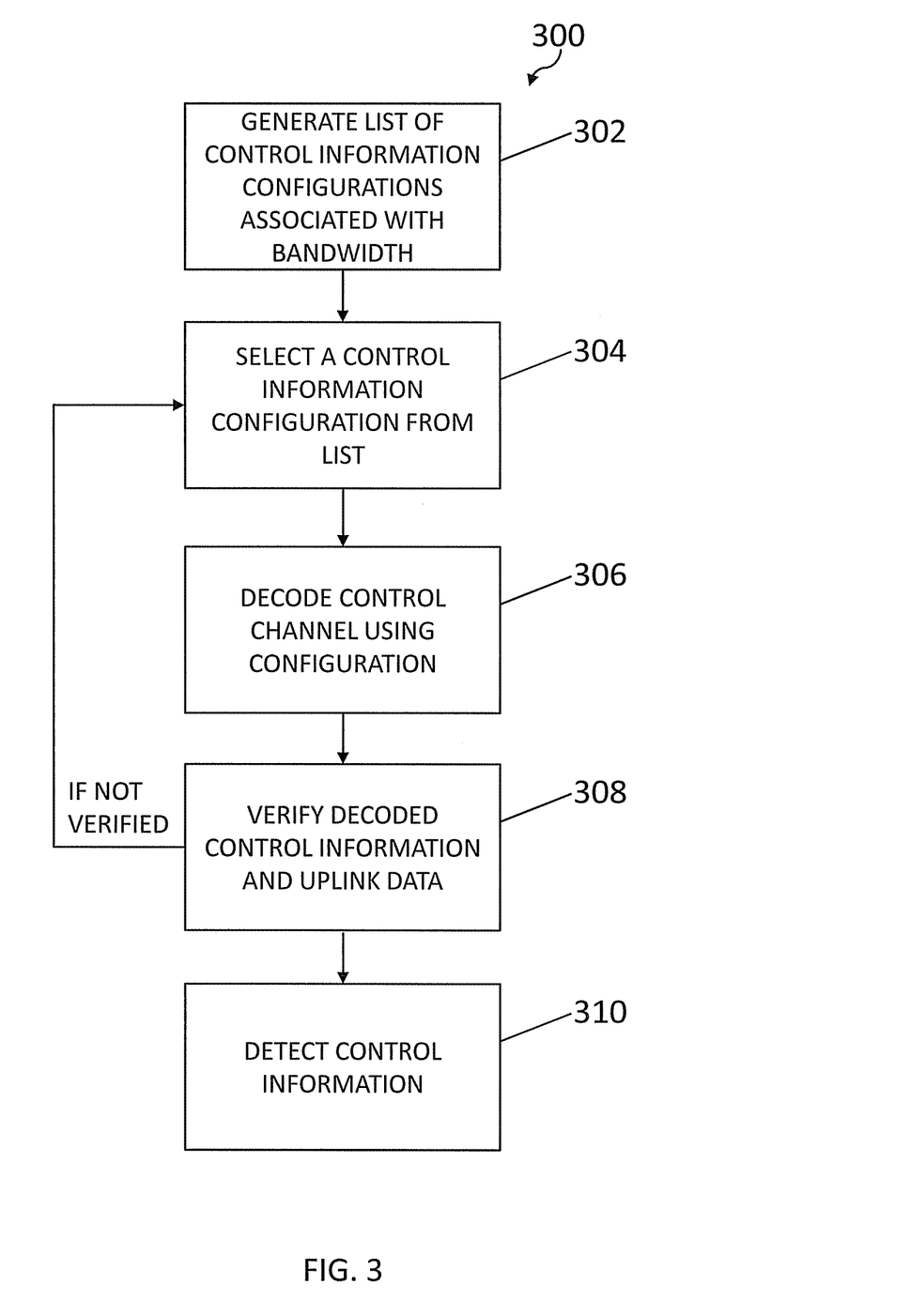
FIG. 3 is a diagram illustrating an exemplary process for decoding uplink data according to an embodiment of the subject matter described herein.

FIG. 3 is a diagram illustrating an exemplary process 300 for decoding uplink data according to an embodiment of the subject matter described herein. Exemplary process 300 may be used to identify a number of possible control information configurations. Exemplary process 300 may also be used to decode uplink data by trying each of the configurations until the uplink data is decoded and control information is identified.

In some embodiments, exemplary process 300 may be performed when uplink data is provided to uplink data processor 104. For example, uplink data may be copied and provided to uplink data processor 104 via an internal or external tap or probe in network 100. In such embodiments, a particular control information format or configuration associated with the uplink data may not be known and, as such, a receiving device (e.g., testing uplink data processor 104) may not know how to parse the uplink data to retrieve control information or other relevant data. In response, receiving device may perform exemplary process 300, starting at step 302, to decode the uplink data.

In step 302, a list of control information configurations may be generated or obtained. The list may be based on a bandwidth associated with received uplink data. In some embodiments, uplink data decoder 106 may use bandwidth and/or other known information to identify a list of possible configurations for decoding uplink data. Hence, by using only possible configurations in attempting to decode uplink data, exemplary process 300 may more quickly determine a correct configuration that can decode uplink data.

For example, a finite number of control information configurations may be possible for LTE uplink data as defined in TS 36.212. These possible configurations may be stored and accessible by uplink data processor 104. Additionally, these stored configurations may be indexed by relevant configuration parameters, including bandwidth or number of antennas at a receiving device. The number of possible control information configurations may decrease when one or more configuration parameters associated with control are already known. For example, bandwidth associated with uplink data may be readily ascertainable since it is a physical characteristic that may be measured by uplink data processor 104 or a radio communications interface therein. In this example, a 20MHz bandwidth may be associated with 'X' number of configurations, while a 3MHz bandwidth may be associated with a different number of configurations.

In step 304, a control information configuration may be selected from the list. For example, after identifying a list of possible configurations having different bit widths, uplink data decoder 106 may select a configuration having a 0 bit width from the list. In this example, a configuration having a 0 bit width may represent uplink data that contains no control information.

In step 306, a control channel may be decoded using the selected configuration. For example, uplink data decoder 106 may use a configuration having a 0 bit width to decode a PUSCH data portion. Using the 0 bit width and/or other configuration information, uplink data decoder 106 may decode or extract a portion of the control channel that corresponds to payload data assuming a control information bit width of 0 bits.

In step 308, decoded control information and uplink data may be verified. For example, uplink data decoder 106 or another module may compute a CRC value for the extracted payload data. If the computed CRC value matches a payload CRC value in the uplink data, it may be assumed that the bit width currently being used is the correct bit width and that the decoded payload data and the control information are also correct. As such, iteration may stop and processing may continue to step 310.

If the computed CRC value does not match a CRC value in the uplink data, it may be assumed that the bit width currently being used is not correct. As such, iteration may continue and processing may continue to step 304 where a different configuration from the list is selected.

In step 310, control information may be detected or identified from the decoded uplink data. For example, uplink data decoder 106 may identify a channel status report from a decoded PUSCH data portion that includes a CQI, a PMI, and/or an RI.

In some embodiments, exemplary process 300, or portions thereof, may be performed multiple times. For example, steps 304, 306, 308, and/or 310 may be performed for each of a plurality of UEs simulated by DUT 102.

Figure 4:
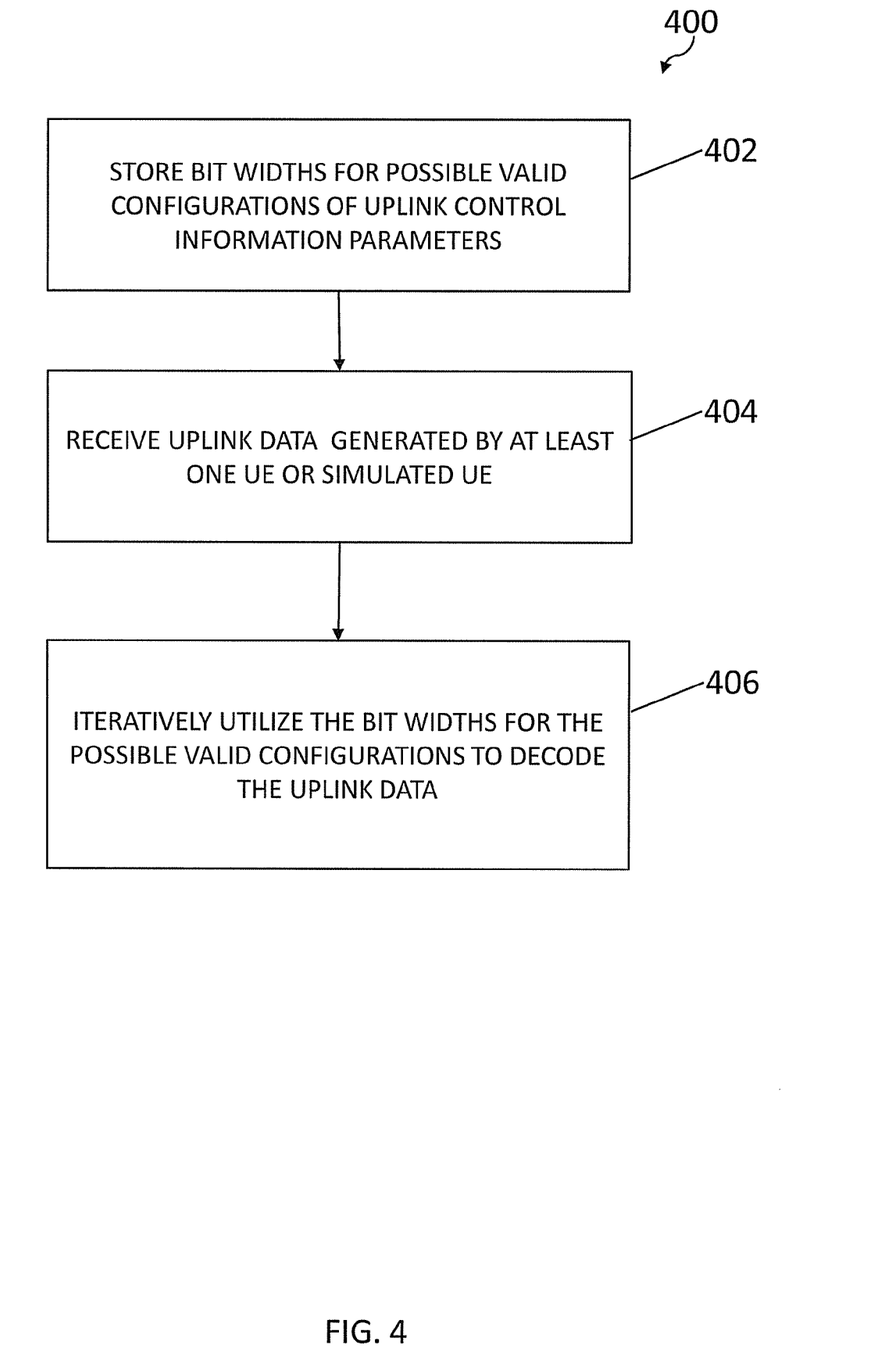
FIG. 4 is a diagram illustrating an exemplary process for automatically decoding uplink data according to an embodiment of the subject matter described herein.

FIG. 4 is a diagram illustrating an exemplary process 400 for decoding uplink data without knowledge of actual UE configurations used to generate the uplink data according to an embodiment of the subject matter described herein. In some embodiments, exemplary process 400, or portions thereof, may be performed by uplink data processor 104, uplink data decoder 106, and/or another module or node.

In step 402, bit widths for possible valid configurations of uplink control information parameters are stored. For example, the plurality of configurations may include bit widths for all possible valid arrangements of control information in a PUSCH data portion or information for deriving such arrangements. In some embodiments, the bit widths for the plurality of configurations may be stored at an initial time (e.g., prior to testing). The possible valid configurations may be any of those found in an industry standards document, such as 3GPP TS 36.212 v11.0.0 (2012-09), the disclosure of which is incorporated herein by reference in its entirety. In step 404, uplink data generated by at least one UE or simulated UE is received. The uplink data may include numerous physical channels that are multiplexed, modulated, and/or encoded, e.g., using SC-FDMA or orthogonal frequency division multiple access (OFDMA).

In some embodiments, the uplink data may include a PUSCH data portion, a PUCCH data portion, an uplink channel portion, a subframe, a PDU, or a data portion.

In some embodiments, the uplink data may include the control information, a payload portion, and a first cyclic redundancy check (CRC) associated with the payload portion.

In some embodiments, the uplink data may be received over an actual or simulated radio communications interface, such as a wireless communications interface, an LTE communications interface, a WiMAX communications interface, an HSPA communications interface, or a wired or optical medium used to simulate a wireless link. In an alternate implementation, the uplink data may be read from a storage medium, such as a database being maintained by an e-node B, in the case where the uplink data decoding by the e-node B is being verified.

In step 406, the uplink data is decoded by iteratively utilizing the bit widths for the possible valid configurations. For example, uplink data decoder 106 may identify potential configurations based on a detected bandwidth or other information associated with the uplink data. In this example, uplink data decoder 106 may identify all configurations that are associated with a wideband of 20 MHz. Using these configurations, uplink data decoder 106 may identify values of 0, 4, and 30 as potential bit widths for a CQI field in the uplink data (e.g., a PUSCH data portion). Uplink data decoder 106 may decode the uplink data using a CQI bit width of zero, then using a CQI bit width of 4, and then using a CQI bit width of 30 until associated CRC values match.

In some embodiments, the bandwidth or other information associated with the data may include readily ascertainable information, a cell identifier, and a received signal strength indicator.

In some embodiments, the one or more configurations may include a bit width associated with the control information, a configuration parameter, an antenna ports value, a bandwidth amount, a sub-band report indicator, a bit width associated with a sub-band label, a wideband report indicator, a rank indication, precoding matrix information, or a transmission mode.

In some embodiments, decoding the uplink data may include iterating through one or more configurations of the plurality of configurations until the uplink data is decoded. For example, iterating may include, for each configuration of the one or more configurations: identifying a bit width associated with the control information in the configuration, identifying, using the bit width, a possible payload portion associated with the uplink data, computing a CRC associated with the possible payload portion, comparing the CRC extracted from the uplink data and the computed CRC, and in response to the CRC extracted from the uplink data and the computed CRC matching, stopping iteration through the one or more configurations.

In some embodiments, identifying, using the bit width, a possible payload portion associated with the uplink data may include determining a start of the potential payload portion by identifying a potential boundary between the potential payload portion and the control information, wherein the bit width indicates the potential boundary and determining an end of the potential payload portion by identifying a known or identifiable boundary between the potential payload portion and the CRC.

Control information may be identified from the decoded uplink data. For example, after a bit width is used to decode a PUSCH data portion, a CQI value or other control information may be identified or detected in the data. In this example, uplink data decoder 106 may use and/or provide the CQI information or other control information to another node or module.

In some embodiments, the control information may include as a channel quality indicator (CQI), a precoding matrix indicator (PMI), a rank indication (RI), a hybrid automatic repeat request (HARQ) indicator (HI), or channel status report information.

In some embodiments, exemplary process 400, or portions thereof, may be performed by a base station, a BTS, a WiMAX base station, an eNode B a Node B, a multi-UE emulator, a UE, an EPC network node, or a testing platform.

In some embodiments, exemplary process 400, or portions thereof, may be performed multiple times. For example, steps 406, and/or 408 may be performed for each of a plurality of UEs simulated by uplink data generator 102.

While aspects of the subject matter described herein have been illustrated for LTE networks and LTE data, it will be appreciated that aspects of the subject matter described herein may be applied to various communications networks and protocols. For example, testing and/or analyzing control information in WiMAX, HSPA, and other wireless networks may use concepts disclosed herein.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for automatically decoding uplink data without knowledge of actual user equipment (UE) configurations used to generate the uplink data, the method comprising:
storing bit widths for possible valid configurations of uplink control information parameters;
receiving uplink data generated by at least one UE or simulated UE; and
iteratively utilizing the bit widths for the possible valid configurations to decode the uplink data, wherein receiving the uplink data includes receiving uplink data transmitted over a wireless communications interface, an LTE communications interface, a WiMAX communications interface, a high speed packet access (HSPA) communications interface, or a wired or optical interface used to simulate a wireless communications link.

2. The method of claim 1 comprising identifying control information or the absence of control information from the decoded uplink data.

3. The method of claim 1 wherein the uplink data includes uplink control information, a payload portion, and a cyclic redundancy check (CRC) associated with the payload portion.

4. The method of claim 3 wherein iteratively utilizing the possible configurations to decode the uplink data includes:
for each of the stored possible valid configurations of uplink control information parameters:
identifying at least one bit width for at least one uplink control information parameter associated with the configuration;
identifying, using the at least one bit width, the possible payload portion in the uplink data;
computing the CRC for the possible payload portion;
comparing the computed CRC with the CRC associated with the payload portion; and
in response to the computed CRC matching the CRC associated with the payload portion, identifying the configuration used to decode uplink data as an actual configuration used to generate the uplink data.

5. The method of claim 4 wherein identifying, using the at least one bit width, the possible payload portion from the uplink data includes determining a start of the potential payload portion by identifying a potential boundary between the potential payload portion and the uplink control information, wherein the at least one bit width indicates the potential boundary and determining an end of the potential payload portion by identifying a known or identifiable boundary between the potential payload portion and the CRC associated with the payload portion.

6. The method of claim 1 wherein receiving the uplink data includes passively copying the uplink data using a monitoring probe.

7. The method of claim 1 wherein receiving the uplink data includes obtaining the uplink data from a device that generates or receives the uplink data from one of the interfaces.

8. The method of claim 3 wherein the uplink data includes a physical uplink shared channel (PUSCH) portion.

9. The method of claim 1 wherein the possible configurations used in the iterations are identified by using a bandwidth or other information associated with the uplink data.

10. The method of claim 9 wherein the bandwidth or other information associated with the uplink data includes a cell identifier, a received signal strength indicator, and a transmission mode.

11. The method of claim 1 wherein the possible configurations each include bit widths associated with each of a plurality of different uplink control information parameters.

12. The method of claim 11 wherein the uplink control information include parameters include a channel quality indicator (CQI), a precoding matrix indicator (PMI), a rank indication (RI), a hybrid automatic repeat request (HARQ) indicator (HI), or channel status report information.

13. The method of claim 1 wherein the possible configurations are used to decode uplink data and identify uplink control information associated with a plurality of different user devices.

14. The method of claim 1 wherein storing the bit widths, receiving the uplink data, and iteratively utilizing the bit widths are implemented on monitoring platform configured to decode uplink data transmitted by a multi-UE simulator to an evolved node B (e-Node B) to verify encoding of the uplink data by the multi-UE simulator or decoding of the uplink data by the e-Node B.

15. A system for automatically decoding uplink data without knowledge of actual user equipment (UE) configurations used to generate the uplink data, the system comprising:
  a memory configured to store bit widths for possible valid configurations of uplink control information; and
  an uplink data decoder configured to receive uplink data generated by at least one UE or simulated UE and to iteratively utilize the bit widths for the possible valid configurations to decode the uplink data, wherein the uplink data is transmitted over a wireless communications interface, an LTE communications interface, a WiMAX communications interface, a high speed packet access (HSPA) communications interface, or a wired or optical interface that simulates a wireless communications interface.

16. The system of claim 15 wherein the uplink data decoder is configured to identify uplink control information or the absence of uplink control information from the decoded uplink data.

17. The system of claim 15 wherein the uplink data includes uplink control information, a payload portion, and a cyclic redundancy check (CRC) associated with the payload portion.

18. The system of claim 17 wherein, for each iteration, the uplink data decoder is configured to:
  identify at least one bit width for at least one uplink control information parameter;
  identify, using the at least one bit width, the possible payload portion in the uplink data;
  compute the CRC for the possible payload portion;
  compare the computed CRC with CRC associated with the possible payload portion; and
  in response to the computed CRC matching the CRC associated with the possible payload portion, identifying the configuration used to decode uplink data as an actual configuration used to generate the uplink data.

19. The system of claim 18 wherein the uplink data decoder is configured to determine a start of the potential payload portion by identifying a potential boundary between the potential payload portion and the control information, wherein the bit width indicates the potential boundary and to determine an end of the potential payload portion by identifying a known or identifiable boundary between the potential payload portion and the CRC associated with the potential payload portion.

20. The system of claim 15 wherein receiving the uplink data includes passively copying the uplink data using a monitoring probe.

21. The system of claim 15 wherein receiving the uplink data includes obtaining the uplink data from a device that generates or receives the uplink data from one of the interfaces.

22. The system of claim 15 wherein the uplink data includes a physical uplink shared channel (PUSCH) portion.

23. The system of claim 15 wherein the possible configurations used in the iterations are identified by using a bandwidth or other information associated with the uplink data.

24. The system of claim 23 wherein the bandwidth or other information associated with the uplink data includes a cell identifier, a received signal strength indicator, and a transmission mode.

25. The system of claim 15 wherein the possible configurations each include bit widths associated with each of a plurality of different uplink control information parameters.

26. The system of claim 25 wherein the uplink control information parameters include a channel quality indicator (CQI), a precoding matrix indicator (PMI), a rank indication (RI), a hybrid automatic repeat request (HARQ) indicator (HI), or channel status report information.

27. The system of claim 15 wherein the possible configurations are used to decode uplink data and identify uplink control information associated with a plurality of different user devices.

28. The system of claim 15 wherein the uplink data decoder is implemented on monitoring platform configured to decode uplink data transmitted by a multi-UE simulator to an evolved node B (e-Node B) to verify encoding of the uplink data by the multi-UE simulator or decoding of the uplink data by the e-Node B.

29. A non-transitory computer readable medium comprising computer executable instructions embodied in a computer readable medium that when executed by a processor of a computer control the computer to perform steps comprising:
  storing bit widths for possible valid configurations of uplink control information parameters;
  receiving uplink data generated by at least one user equipment (UE) or simulated UE; and
  iteratively utilizing the bit widths for the possible valid configurations to decode the uplink data, wherein the uplink data is transmitted over a wireless communications interface, an LTE communications interface, a WiMAX communications interface, a high speed packet access (HSPA) communications interface, or a wired or optical interface that simulates a wireless communications interface.

* * * * *